United States Patent
Chapman et al.

(10) Patent No.: US 6,247,369 B1
(45) Date of Patent: Jun. 19, 2001

(54) MULTI-CHANNEL ELECTRONICALLY SCANNED CRYOGENIC PRESSURE SENSOR AND METHOD FOR MAKING SAME

(75) Inventors: John J. Chapman, Ware Neck; Purnell Hopson, Jr., Seaford; Nancy M. Holloway, Hayes, all of VA (US)

(73) Assignee: The United States of America as represented by the Administrator of the National Aeronautics of Space Administration, Washington, DC (US)

( * ) Notice: Subject to any disclaimer, the term of this patent is extended or adjusted under 35 U.S.C. 154(b) by 0 days.

(21) Appl. No.: 09/229,931

(22) Filed: Jan. 13, 1999

Related U.S. Application Data

(63) Continuation-in-part of application No. 08/944,026, filed on Aug. 25, 1997, now abandoned, which is a continuation of application No. 08/416,596, filed on Apr. 4, 1995, now abandoned.

(51) Int. Cl.[7] ........................................ G01L 9/04
(52) U.S. Cl. ........................................... 73/726
(58) Field of Search .................... 73/708, 714, 720, 73/721, 726, 727, 719, 725

(56) References Cited

U.S. PATENT DOCUMENTS

| | | |
|---|---|---|
| 3,938,175 | 2/1976 | Jaffe et al. . |
| 4,003,127 | 1/1977 | Jaffe et al. . |
| 4,434,384 | 2/1984 | Dunnrowicz et al. . |
| 4,670,969 | 6/1987 | Yamada et al. . |
| 4,746,893 | 5/1988 | Shak . |
| 4,771,639 | 9/1988 | Saigusa et al. . |
| 4,772,523 | 9/1988 | Mace et al. . |
| 4,895,290 | 1/1990 | Dunnrowicz et al. . |
| 4,984,046 | 1/1991 | Graeger et al. . |
| 4,994,781 | 2/1991 | Sahagen . |
| 4,996,082 | 2/1991 | Guckel et al. . |
| 5,167,158 | 12/1992 | Kamachi et al. . |
| 5,174,926 | 12/1992 | Sahagen . |
| 5,442,595 | 8/1995 | Dorr . |
| 5,681,997 | 10/1997 | McHale et al. . |

*Primary Examiner*—William Oen
(74) *Attorney, Agent, or Firm*—Robin W. Edwards

(57) ABSTRACT

A miniature, multi-channel, electronically scanned pressure measuring device uses electrostatically bonded silicon dies in a multi-element array. These dies are bonded at specific sites on a glass, pre-patterned substrate. Thermal data is multiplexed and recorded on each individual pressure measuring diaphragm. The device functions in a cryogenic environment without the need of heaters to keep the sensor at constant temperatures.

21 Claims, 11 Drawing Sheets

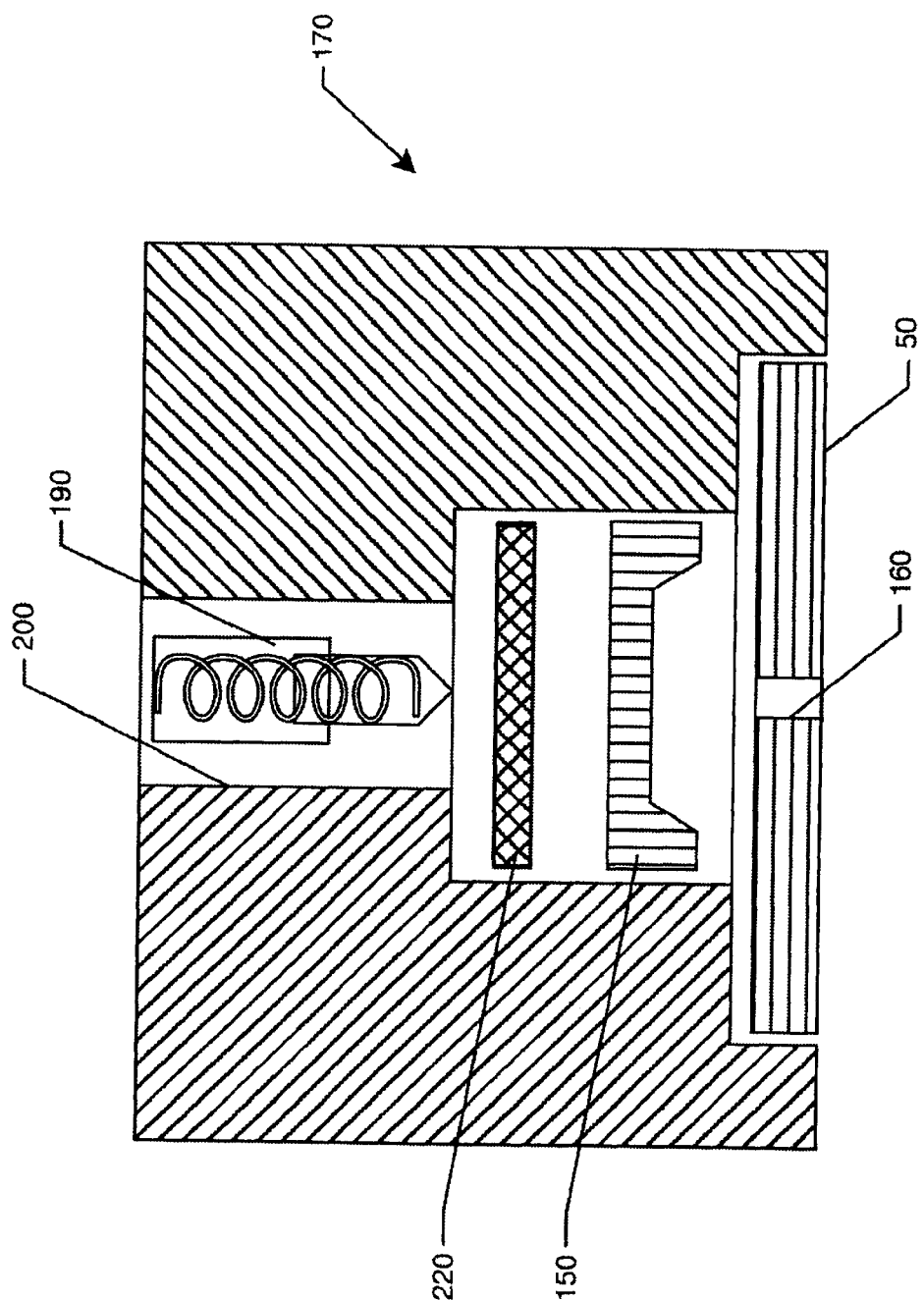

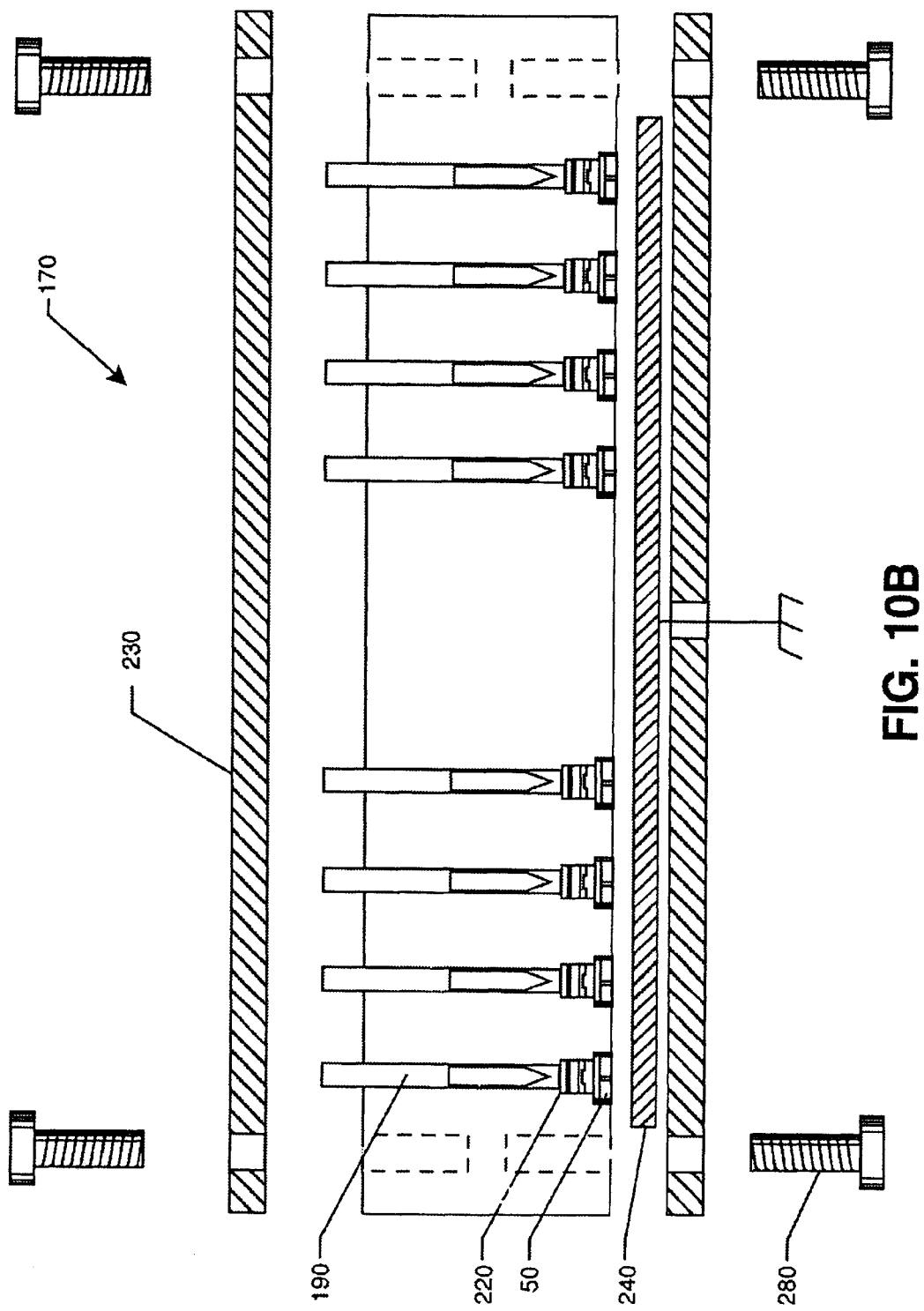

MULTI-CHANNEL ELECTRONICALLY SCANNED CRYOGENIC PRESSURE SENSOR AND METHOD FOR MAKING SAME

CROSS REFERENCE

This is a continuation-in-part application for patent application Ser. No. 08/944,026, filed Aug. 25, 1997, which is a continuation application for patent application Ser. No. 08/416,596, filed Apr. 4, 1995, both of which are now abandoned.

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

1. Field of the Invention

This invention relates generally to a pressure sensor and more particularly to a multi-channel electronically scanned pressure sensor for cryogenic environments.

2. Description of the Related Art

There are currently 17 cryogenic wind tunnels in operation worldwide, most operate in a temperature range of −190° C. to +70° C. The coldest temperature falls approximately 140° C. below the lowest mil-spec temperature for the performance rating of electronic components. In an effort to develop higher lift and lower drag airfoils, aerodynamicists are striving to study boundary layer behavior at very high Reynolds numbers. Cryogenics is used to lower flow temperatures to achieve high Reynolds numbers by increasing flow density. These low temperatures present problems with instrumentation hardware designed to measure pressure when subjected to this cold environment.

The prior art uses adhesive bonding of individual silicon pressure sensing die of silicon or Pyrex. A stress isolation pedestal may also be incorporated. An adhesive material is required to secure each sensor to the substrate. Since the adhesive exhibits a large variation in coefficient of thermal expansion (CTE) with temperature, this results in large apparent strains being exerted upon the sensors as thermal cycling occurs. Adhesive materials with critical transition temperatures above 77 K will also cause thermally induced offset variations, which will cause non-repeatability of sensor output data in cryogenic applications. This problem is more accentuated with the use of thinner membrane thicknesses necessary for accurate measurements in cryogenic wind tunnels.

OBJECTS OF THE INVENTION

It is accordingly an object of this invention to provide a device capable of performing multichannel pressure measurements at cryogenic temperatures.

It is another object of the present invention to perform the pressure measurements with increased accuracy, low noise and improved repeatability at cryogenic temperatures.

Additional objects and advantages of the present invention are apparent by the drawings and specification that follow.

SUMMARY OF THE INVENTION

The present invention overcomes the problem of measuring pressure in a cryogenic environment. This is accomplished by providing a miniature, multi-channel, electronically scanned pressure measuring device that uses electrostatically bonded silicon dies in a multi-element array. These dies are bonded at specific sites on a Pyrex 7740 glass substrate pre-patterned with gold circuit traces. In addition, thermal data is multiplexed and recorded on each individual pressure measuring diaphragm.

The electronics package consists of basically two parts: an amplifier circuit comprised of a monolithic instrumentation amplifier on a standard printed circuit card, and a gold circuit patterned Pyrex glass substrate comprised of pressure sensing dies and multiplexing devices. Pyrex is a trademark of Corning, Inc.

The pressure sensing device utilizes square silicon dies that have been etched on the back surface to form a very thin silicon diaphragm. The diaphragm has four highly doped (e.g., boron) piezo-resistive elements of the same geometry patterned in the diaphragm surface, two acting in compression and two acting in tension. There is also one additional bridge element on the die rim, insensitive to pressure, which provides a temperature measurement of each silicon pressure sensing die used for temperature compensation. In order for the silicon pressure sensing dies to operate properly below −100° C., it is necessary that the dopant impurity level be on the order of $1E^{20}$ atoms of boron per cubic centimeter. This dopant level ensures that the sensors do not suffer from charge carrier freezeout due to low charge carrier mobility.

The requirement for structural integrity in electronic packaging is met by the use of metallic materials with low coefficients of thermal expansion such as Kovar. The coefficient of thermal expansion of Pyrex 7740 glass matches that of silicon well enough to tolerate thermal cycling in properly annealed substrates. The Pyrex substrate is first metallized with titanium/tungsten for the adhesion layer and then a layer of gold is deposited for good conduction. The circuitry pattern is then etched to produce low resistance, high quality tracks. The silicon pressure sensors are bonded to the metallized substrate by field-assisted thermal bonding. This process takes place at 375° C. It is performed under high vacuum with an applied field strength of 1E6 volts per meter on the silicon sensors-Pyrex interface. After bonding, the sensor substrate is then attached to the tubing plate using a thin sheet of thermosetting polyamide film. The modified polyamide material remains flexible at −196° C. and provides a compliant bond between these two surfaces. The electrical interconnection of the sensor circuitry to the substrate is made using a thermo-ultrasonic wedge-ball bonding machine with substrate heating applied.

A modified, commercially available analog-to-digital converting data acquisition interface card is used to scan the pressure inputs. Since the instrumentation module is equipped with its own instrumentation amplifier and multiplexing circuitry, the interface could be streamlined by interconnecting the instrumentation amplifier output directly to the sample and hold input on the PC card with coaxial cable. This improves the signal to noise ratio since all millivolt level signal leads are contained within the instrument module and are just a few centimeters in length. Similarly, the multiplexing switches are also within the module. Linking the address and enable lines from the remote module to the timing circuitry on the PC card via line drivers and receivers ensures quiet, reliable operation. The output of the instrumentation amplifier is digitized by the A/D card in the PC. Data taken is first stored to RAM, then saved to diskette and displayed as real-time engineering units on the monitor. The data rate and sample time interval for a data record is preset by the scanning software parameters. The menu driven software provides for access to data files for storage, recall of sensor calibration files and for real time display.

This invention functions in a cryogenic environment without the need of heaters to keep the sensor at constant temperatures. The fabrication technique and materials used produce an instrument that will deliver repeatable data each time it is thermal cycled without recalibration. In addition, each pressure measuring component has its own temperature sensor, thereby eliminating thermal offset errors due to changing temperatures.

In addition, the advantage over existing devices is the freedom from hand mounting of each sensor and freedom from the tedious application of elastomer or adhesive bonding material to each sensor. The sensor array is one coupon, just as if it was a VLSI circuit with the sensors precisely positioned on the substrate without any trace of die attach adhesive. The application of pressure sensors to make accurate measurements is greatly enhanced due to this measure. The adhesive material necessary to attach sensors in prior art is not conducive to accurate measurements since the elastomeric material expands and contracts with temperature variations. This undesirable effect applies mechanical forces to the sensors in such a fashion as to cause drift. The main advantage of this method is in cryogenic applications. The sensors remain bonded throughout hundreds of thermal cycles and exhibit stable and repeatable calibrations for years. The accuracy of the sensors is stable and there is no need for any mechanical calibration valve apparatus within the measuring instrument.

The exact placement of the sensors will facilitate automated or manual ballbond electrical lead placement. The elastomerically bonded sensors usually have some randomness to the positioning and also have elastomeric residue present plus undesirable outgassing fumes from the curing process can cause corrosive effects on nearby components. The main advantage is in the stability. The curing process takes up to a full year to complete and this affects the measurement accuracy of the instrument since the elastomeric material induces random drift in the sensor, which cannot be accounted for by any means other than frequent recalibration, which is very costly in the case of wind tunnels. Another advantage is that the sensing module can operate accurately at cryogenic temperature and thus does not need auxiliary heaters to maintain a warm environment during wind tunnel testing. This elimination of the heating requirement while maintaining the high accuracy is a great asset since the model in which the modules reside during the test is not subject to heating effects from instrumentation within the model. This has the beneficial effect of allowing the model to remain at the true freestream temperature of the wind tunnel. Existing technology simply did not allow this, and as a result there was an unwanted disturbance of the boundary sublayer during cryogenic testing of any model equipped with auxiliary heaters.

BRIEF DESCRIPTION OF THE DRAWINGS

FIG. 10a is a cutaway view of a portion of the fabrication fixture;

FIG. 10b is a side view of the fabrication fixture;

DESCRIPTION OF THE PREFERRED EMBODIMENTS

The electronics package consists of basically two parts: an amplifier circuit comprised of a monolithic instrumentation amplifier on a standard printed circuit card, and a gold circuit patterned Pyrex glass substrate comprised of pressure sensing dies and multiplexing devices.

Figure 1A:
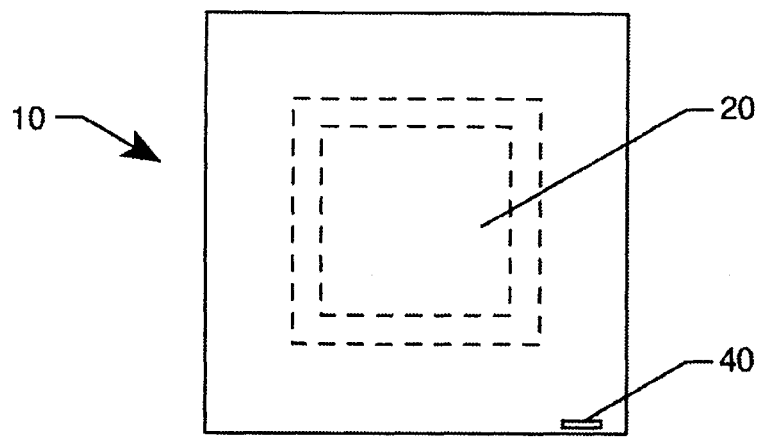
FIG. 1a is a top view of a die.
Figure 1B:
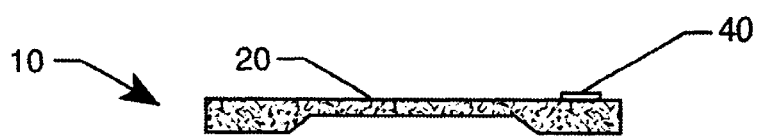
FIG. 1b is a side view of a die.
Figure 2:
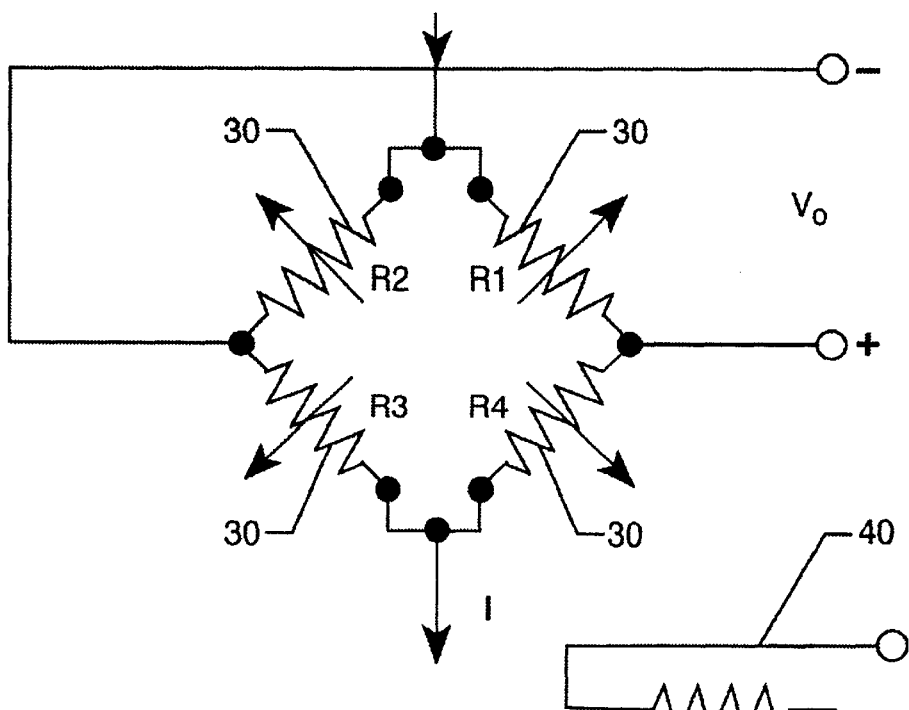
FIG. 2 is a schematic illustration of the resistor arrangement.
Figure 3:
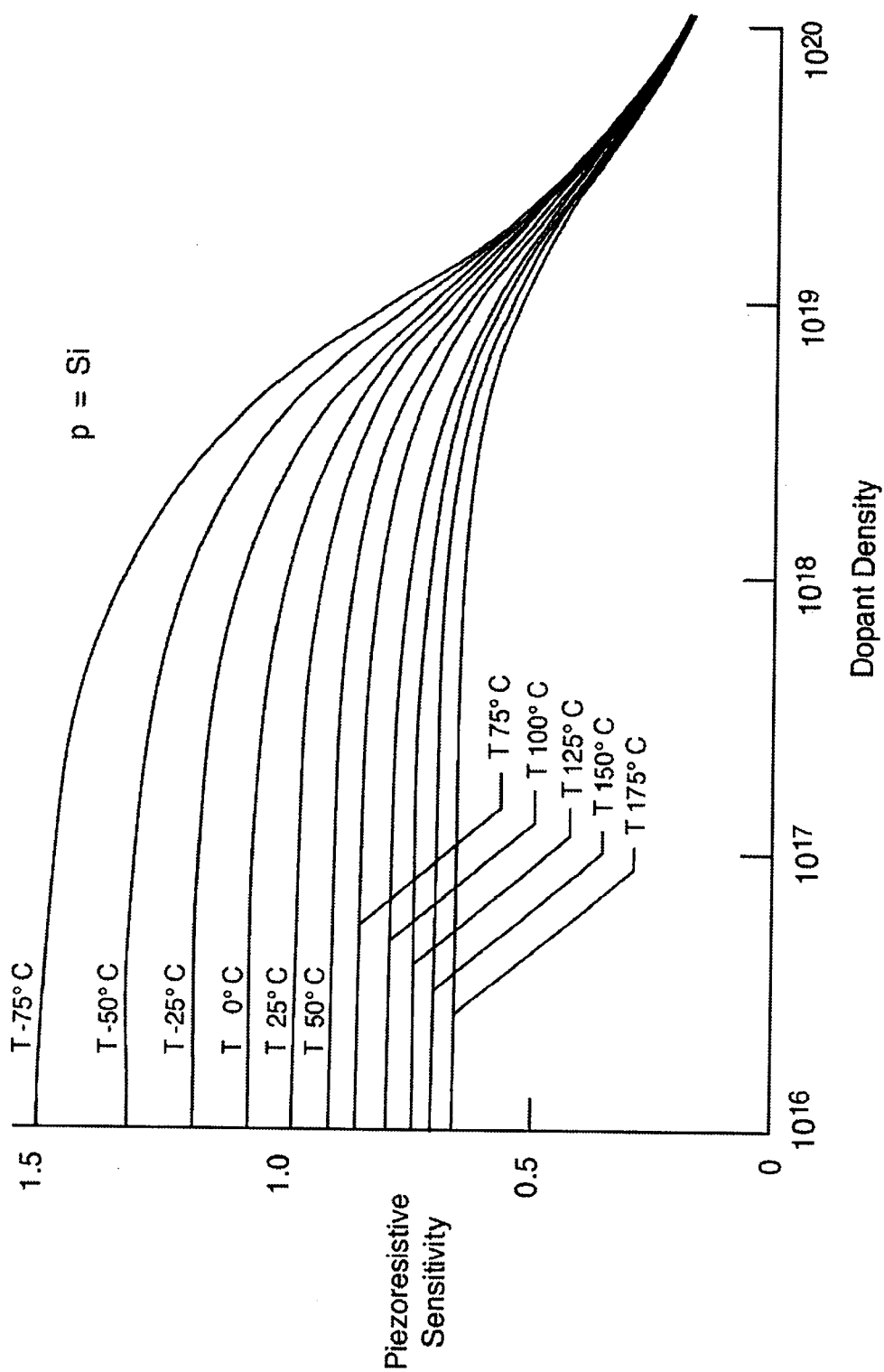
FIG. 3 is a graph of piezoresistance coefficient versus temperature.
Figure 4:
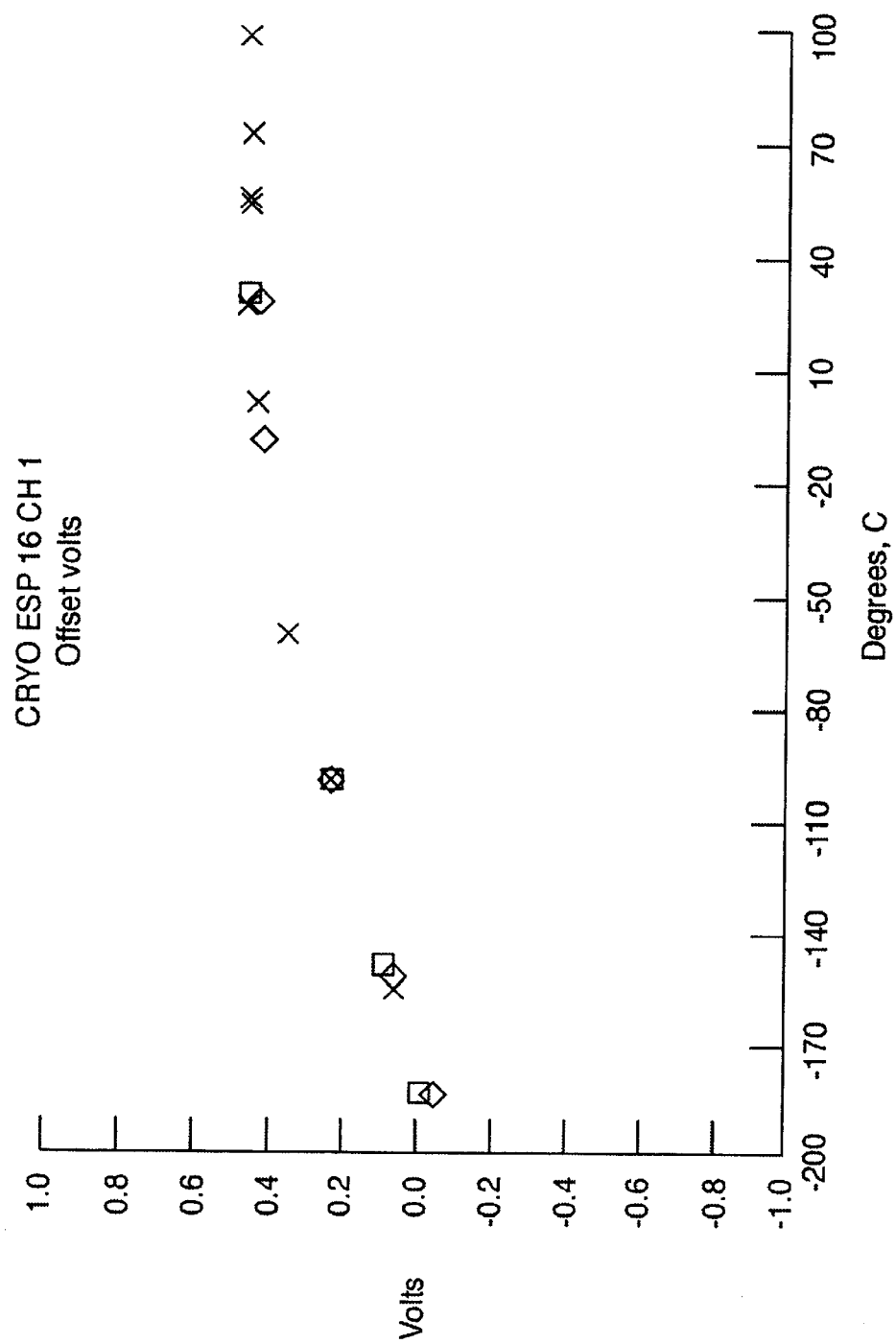
FIG. 4 is a plot of offset hysteresis.
Figure 5:
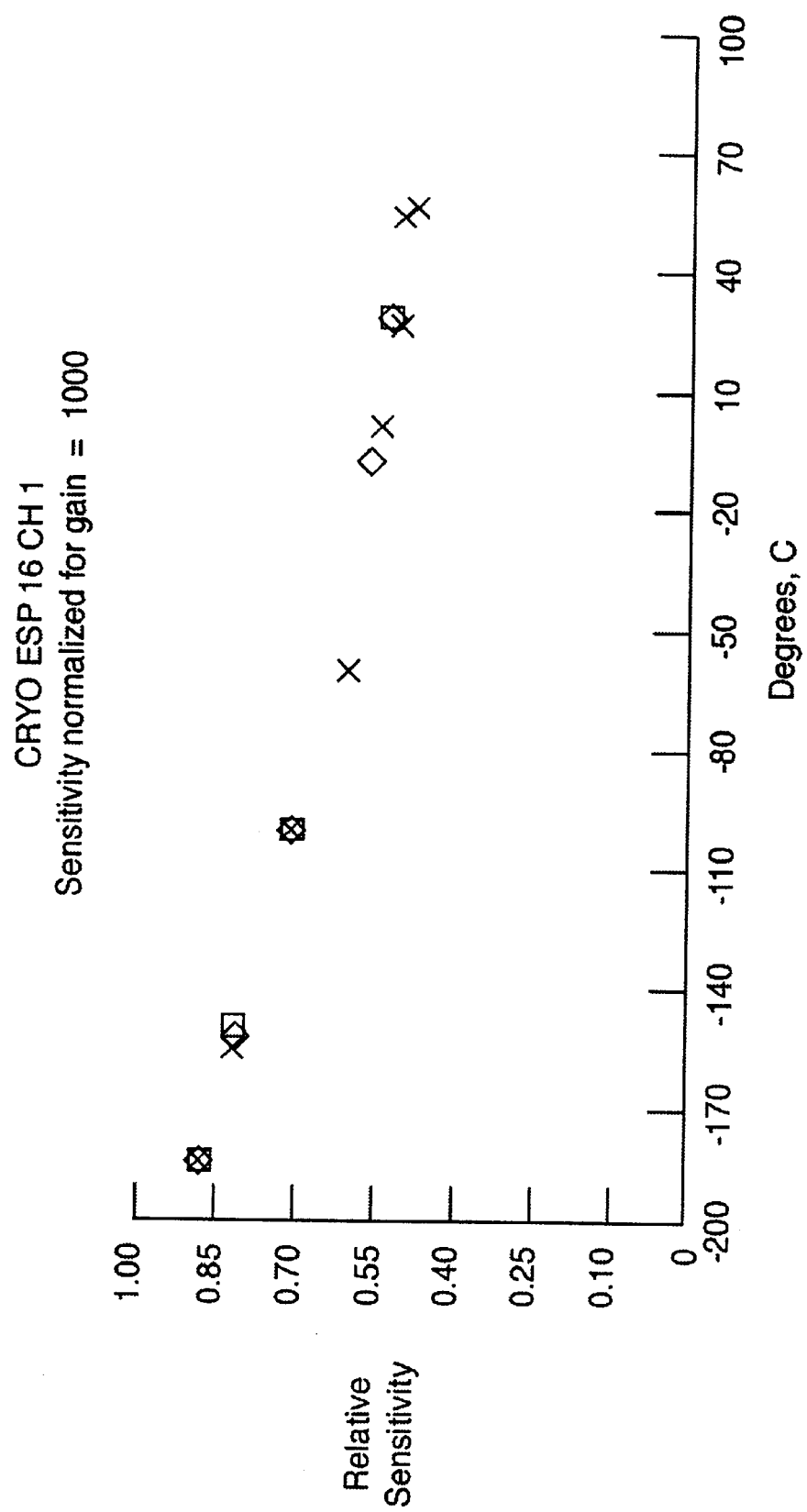
FIG. 5 is a plot of sensitivity hysteresis.

Referring to FIGS. 1a and 1b, the electronics device utilizes square silicon dies 10, approximately 2.54 mm on each side, which have been etched on the back surface to form a very thin silicon diaphragm 20, approximately 0.3 mm high. Either single crystal silicon or polysilicon can be used. Polysilicon functions as well or better than single crystalline silicon and, due to the fabrication process of polysilicon, polysilicon devices are less expensive than single crystal devices. Referring to FIG. 2, the diaphragm 20 has four highly doped (e.g., boron) piezo-resistive elements 30 of the same geometry patterned diffused in the diaphragm surface, two acting in compression and two acting in tension. There is also one additional bridge element 40 on the die rim, insensitive to pressure, which provides a temperature measurement of each silicon pressure sensing die used for temperature compensation. As illustrated in FIG. 3, in order for the silicon pressure sensing dies to operate properly below −100° C., it is necessary that the dopant impurity level be in the range of $1\times10^{19}$ to $1\times10^{21}$ atoms of boron per cubic centimeter. The higher the level of boron, the greater the insensitivity to cold. This dopant level ensures that the sensors do not suffer from charge carrier freezeout due to low charge carrier mobility. The piezoresistive pressure sensors are influenced not only by the thermal offset and sensitivity shifts in the bridge resistors but also are heavily influenced by mechanical mounting effects between the die and substrate due to temperature dependent differences in coefficient of thermal expansion between the die and substrate materials, all of which contribute to the sensor overall thermal offset drift. Plots of individual sensors, mounted by the preferred method of field assisted bonding to a Pyrex 7740 substrate yield smoothly varying, repeatable offset and sensitivity curves, as shown in FIGS. 4 and 5, respectively.

Figure 6:
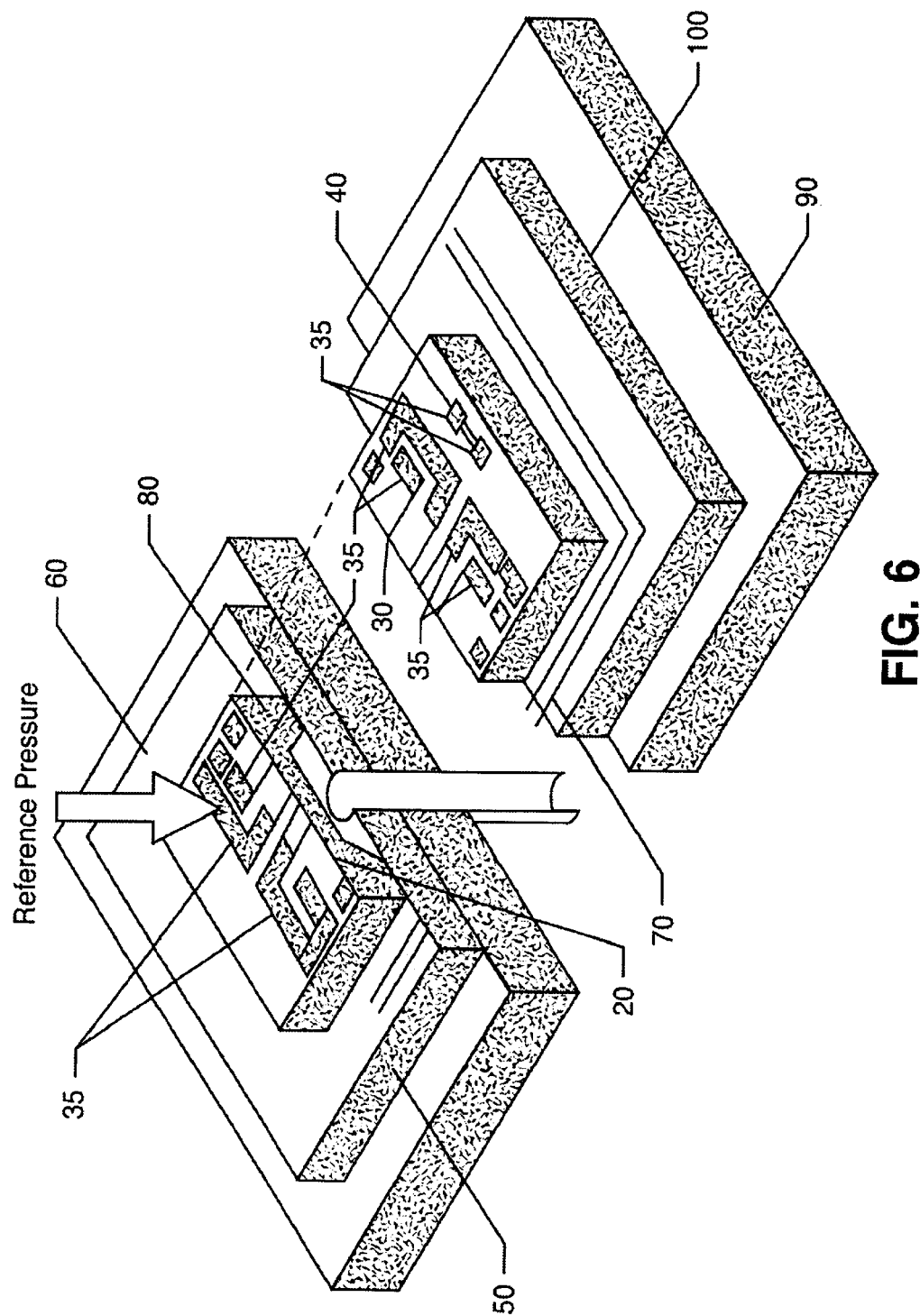
FIG. 6 is a cutaway view of a pressure sensor bonded to a substrate.

The requirement for structural integrity in electronic packaging is met by the use of metallic materials with low coefficients of thermal expansion such as Kovar. The coefficient of thermal expansion of Pyrex 7740 glass matches that of silicon well enough to tolerate thermal cycling in properly annealed substrates. Referring to FIG. 6, the Pyrex substrate 50 is first metallized with titanium/tungsten for the adhesion layer 60 and then a 1.5 micrometer layer of gold is deposited 70 to provide for good conduction and to provide a nonoxidizing barrier. The nonoxidizing barrier allows for annealing in air, as discussed later herein, in reference to FIG. 10c. The circuitry pattern is then etched to produce low resistance, high quality tracks. The silicon pressure sensors 80 are bonded to the metallized substrate 50 by field-assisted thermal bonding. This process, otherwise referred to as Mallory bonding by the electronics industry, takes place at 375° C. It is performed under high vacuum with an applied field strength of 1>$10^6$ volts per meter on the silicon sensors-Pyrex interface. After bonding, the sensor substrate is then attached to the tubing plate 90 using a thin sheet of thermosetting polyamide film 100. The modified polyamide material remains flexible at −196° C. and provides a compliant bond between these two surfaces. The electrical interconnection of the sensor circuitry to the substrate is made using a thermo-ultrasonic wedge-ball bonding machine with substrate heating applied.

Figure 9:
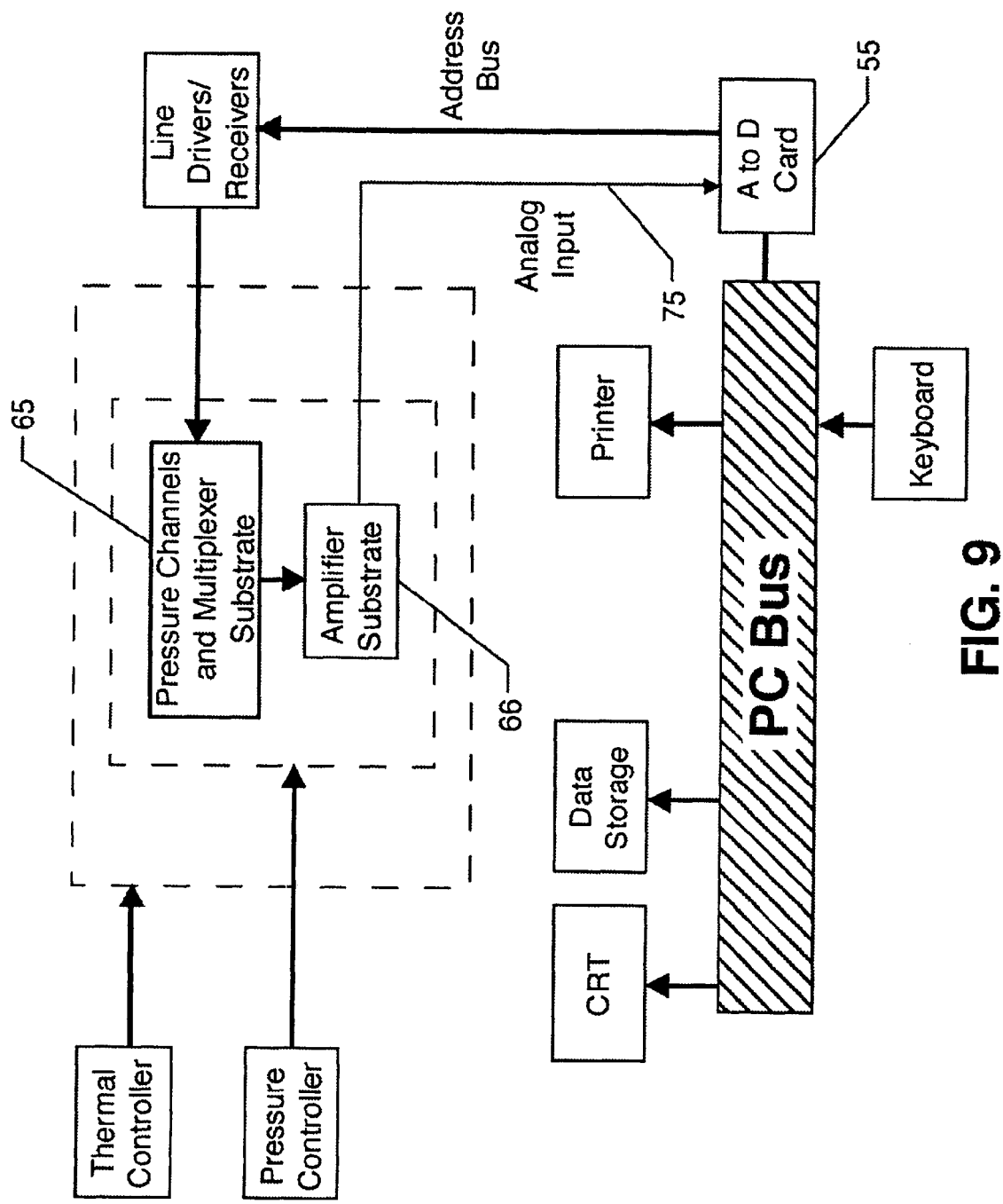
FIG. 9 illustrates the PC interface with the pressure/temperature calibration system.

A modified, commercially available, high resolution analog to digital (A/D) conversion interface card is used to scan the pressure inputs. Referring to FIG. 9, since the instrumentation module is equipped with its own instrumentation amplifier 66 and multiplexing circuitry 65, the interface can be streamlined by interconnecting the instrumentation amplifier output directly to the sample and hold input on the PC card 55 with coaxial cable 75. This improves the signal to noise ratio since all millivolt level signal leads are contained within the instrument module and are just a few centimeters in length. Similarly, the multiplexing switches are also within the module. Linking the address and enable lines from the remote module to the timing circuitry on the PC card via line drivers and receivers ensures quiet, reliable operation. The output of the instrumentation amplifier is digitized by the A/D card in the PC. Data taken is first stored to RAM, then saved to diskette and displayed as real-time engineering units on the monitor. The data rate and sample time interval for a data record is preset by the scanning software parameters. The menu driven software provides for access to data files for storage, recall of sensor calibration files and for real time display.

Referring to FIGS. 1a–b, 2 and 6, four resistive elements 30 on the die diaphragm 20 are connected in a Wheatstone Bridge configuration by means of gold wire bonding. A constant D.C. voltage is placed across two legs of the bridge as input voltage, and the other two legs are voltage outputs. When pressure is applied to the silicon diaphragm a strain occurs, causing a resistance imbalance in the bridge thereby causing an output voltage or a change in the existing output voltage on the output legs of the bridge. This output voltage is applied to a differential multiplexer switch. Referring to FIG. 9, the output of the multiplexer 65 is tied to the input of an instrumentation amplifier 66. The fifth element on the die periphery 40 is on part of the silicon die bulk that supports the thin diaphragm, and the element is patterned in a location and with a geometry that renders it insensitive to strain, but the element changes resistance proportional to temperature. This element is powered with a constant current and the change in resistance due to change in temperature produces a change in voltage drop across the element. This voltage change is connected to a multiplexer switch 65 in the same manner as the pressure sensing elements on the die diaphragm. Referring to FIG. 9, the pressure measuring module communicates to the outside world through a personal computer equipped with analog to digital converters and controlling software. The computer software produces and delivers binary addresses and phased enable pulses to the module multiplexer chips that are connected to all the pressure sensing dies. These computer generated pulses cause the multiplexer chips to scan the pressure dies and temperature sensors on each die.

Figure 7:
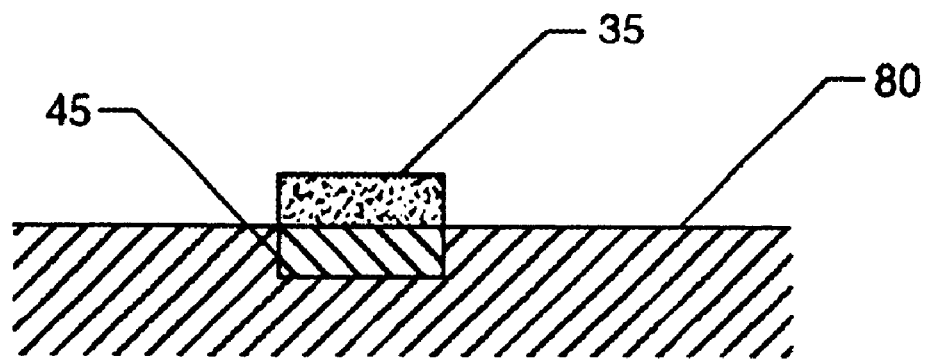
FIG. 7 is a cross-section view of a metallization track and underlying high dopant layer on a silicon die.
Figure 8:
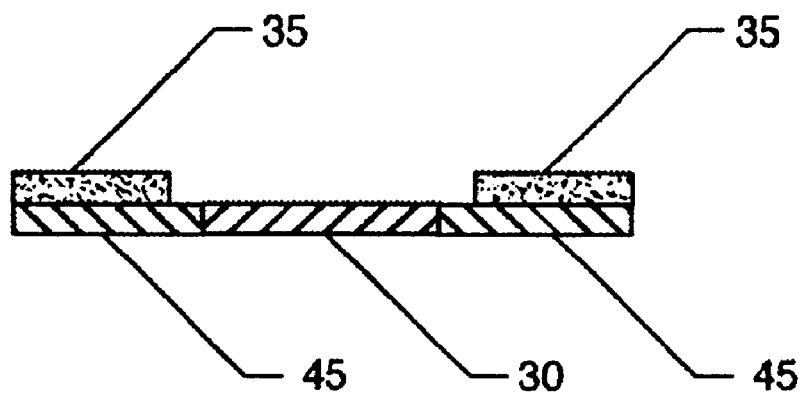
FIG. 8 is a cross-section view of silicon pressure die metallization tracks, underlying high dopant layer, and resistive element.

Referring to FIGS. 6 and 7, a high dopant (e.g., boron) layer 45 is provided under the metallization (track) layer 35 for good conduction. High dopant layer 45 is fabricated either by diffusion or implantation of boron atoms into the silicon pressure sensor 80. This high dopant layer 45 prevents cracking in the metallization (track) layer resulting from cryo-cycling. The dopant impurity level should be in the range of $1\times10^{19}$ to $1\times10^{23}$ atoms of boron per cubic centimeter. In addition, this high dopant layer runs continuous to the highly doped peizo-resistive elements 30, as shown in FIG. 8.

Figure 10C:
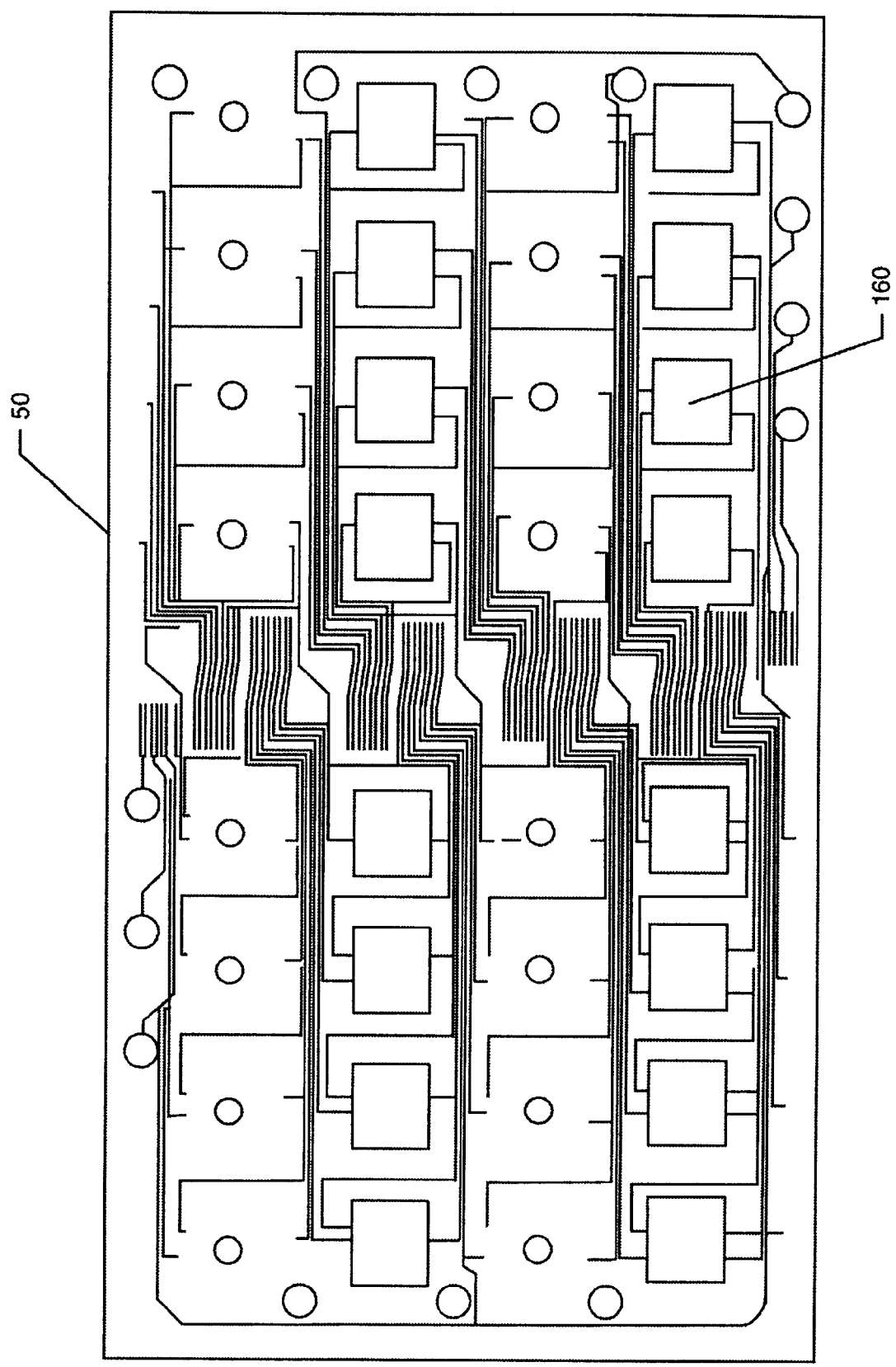
FIG. 10c is a top view of the substrate.

Referring again to FIG. 6, fabrication of the sensing portion of this package involves the electrostatic bonding of highly doped piezoelectric silicon pressure dies 80 to a 7740 Pyrex glass substrate 50. Prior to die bonding, the glass substrate 50 is metallized, by sputter deposition with a thin adhesion layer 60, (approximately 1000 Angstroms), of tungsten with 10% titanium. This adhesion layer 60 is over-coated with approximately one micrometer of sputtered gold. Both the adhesion layer 60 and gold layer 70 are deposited in the same machine without breaking vacuum. The metallized glass substrate 50 is circuit patterned by standard photolithography. Referring to FIG. 10c, the metallized and patterned substrate is then drilled with 0.025 inch holes 160 at each silicon die location and thermally annealed in air at 600° C. for one hour. This completes the glass substrate preparation.

Figure 10D:
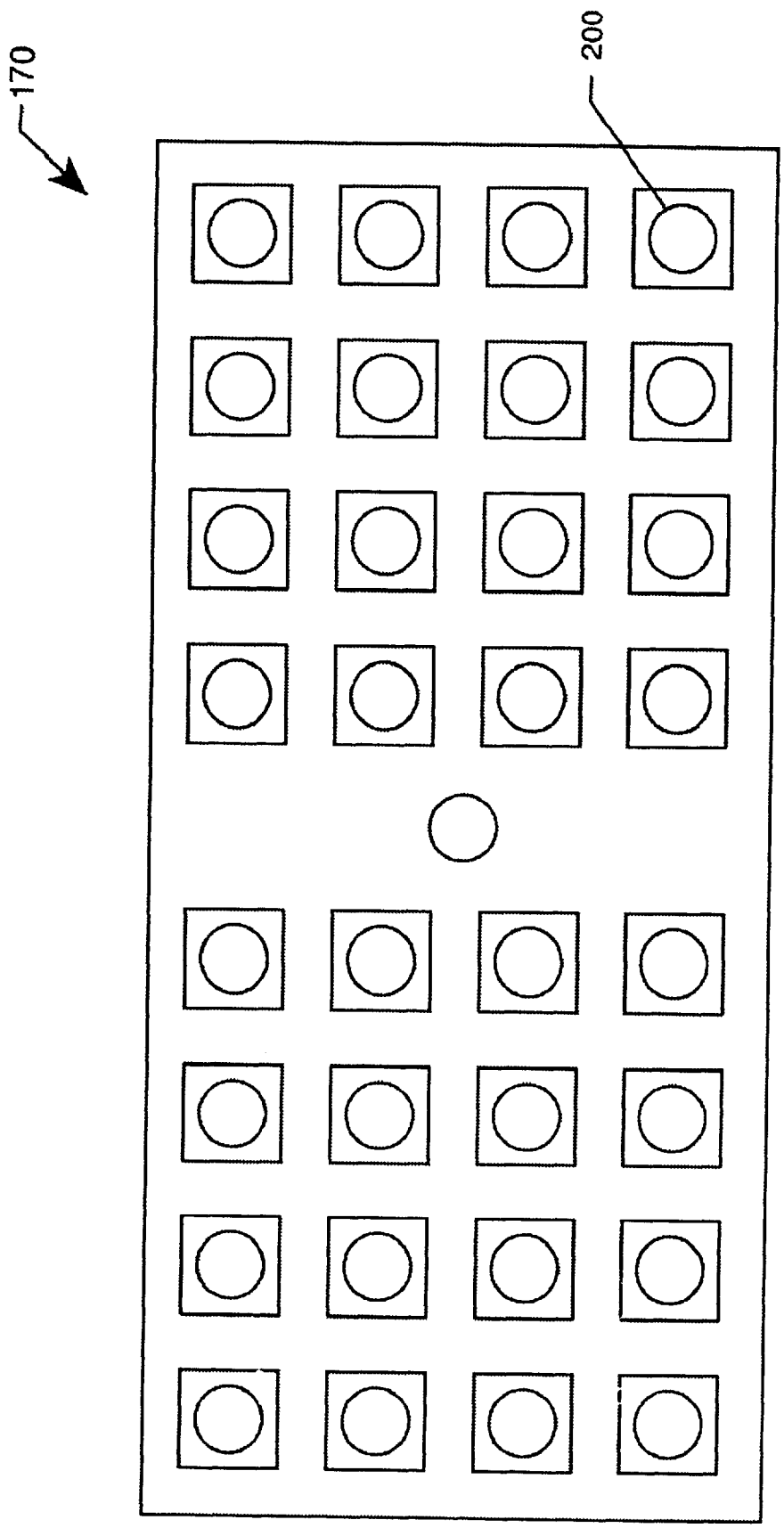
FIG. 10d is a top view of a portion of the fabrication fixture.

Referring to FIGS. 10a, 10c and 10d, the silicon dies 150 and the prepared glass 50 are loaded in a fixture 170 of a dielectric ($SiO_2$) high temperature material. The fixture 170 is designed to hold the individual sensors to form a sensor array. This sensor array is held in position over the metallized substrate 50 so that each die is precisely positioned over its 0.025 inch pressure orifice 160. In addition to positioning, this cast fixture allows for pressure to be applied to each silicon die 150, to bring the die into close contact with the glass substrate 50. Contacting pressure is applied to the silicon die 150 by spring loaded contacts 190 inserted into holes 200 cast in the fixture 170 centered over each pressure die location. The loaded fixture is placed into a tube furnace and evacuated to a pressure below $5\times10^{-6}$ torr and heated to 375° C. When the temperature has reached equilibrium, an electrical potential of 800 volts D.C. is applied to the fixture electrodes for five minutes causing electrostatic bonding of the silicon pressure dies to the glass substrate 50. The glass substrate with bonded silicon dies are then mounted to a Kovar pressure tube plate with pressure orifices aligned over each 0.025 inch hole in the glass substrate. The fixture was made by casting soft gel state $SiO_2$ over a male plug mold having slightly larger dimensions than the finished sensor array. The $SiO_2$ material was fired in a kiln just as a ceramic material to make it hard. The $SiO_2$ was chosen due to its desirable material properties of the fired product, low temperature coefficient of linear expansion, high dielectric strength, ability to withstand high temperature, and low outgassing for vacuum processing during the bonding operation.

Each cavity has the same outline as the individual sensor which is inserted into the cavity. The depth of the cavity is sufficient to accept the sensor and a "top hat" piece 220 of silicon with the same outline as the sensor which is inserted into the fixture before the sensor in order to distribute the mechanical load induced by the spring loaded pin 190. The spring loaded pin 190 is used to hold the sensor chip in intimate contact with the Pyrex substrate 50 during the bonding process. Referring to FIG. 10b, the pin 190 also allows an electrical contact for the bonding potential to be applied to the sensor 250 when the fixture is connected as shown in FIG. 10d with the end plate (anode) 230 and metallized quartz bottom cathode 240. For the bonding operation, the top hats 220 are loaded in the cavities. The sensors 50 are then loaded, membrane side in contact with the top hats 220. The drilled and metallized Pyrex substrate 50 is put in contact with the sensors 50 and the metallized quartz cathode 240 is placed against the bottom of the fixture. The spring loaded pins 190 are inserted from the top of the fixture. The top plate or anode 230 is then put over the pins 190 and the plates are secured by stainless bolts 280. The loaded fixture is then placed in a vacuum oven, pumped down and the oven temperature adjusted to 375° C. An inert atmosphere such as nitrogen, argon or helium could be used in lieu of evacuation to prevent oxidation. Once thermal equilibrium is reached, an 800 volt potential is then applied to the fixture, the bonding takes place in just a few minutes. The oven is then allowed to cool to room temperature and the fixture is removed, unbolted and opened up to free the substrate which is ready for mounting on the tubing plate. A polyamide film adhesive material is used for the attachment of the sensor array which is comprised of the individual sensors to the tubing plate. This material in thin sheet form has demonstrated flexibility when dipped in liquid nitrogen since it remains compliant at cryogenic temperatures. The polyamide sheet is first cut to the size of the Pyrex substrate and holes are punched to allow gas conductance of the pressure ports. For the assembly, the polyamide film 100 is placed on the tubing plate 90 so the holes line up. The sensor array Pyrex coupon is then placed upon the polyamide film, with the holes registered. The tubing plate and positioned array is placed within a vacuum bag which is then evacuated and placed in an oven at +125° C. The polyamide is plastic at high temperatures and flows between the bottom of the Pyrex substrate and the tubing plate. This forms a compliant layer between the Pyrex coupon and the tubing plate that withstands the extreme temperatures and remains free from leakage at cryogenic temperatures. A high temperature polyamide film material may also be used for instruments destined for high temperature applications. As an alternative, the application of a polyimide in liquid suspension in solvent is also possible for the purpose of attaching the Pyrex coupon to the tubing plate. A curing cycle at elevated temperature is required.

After substrate to pressure tubing plate mounting is complete, the multiplexer chips are mounted on the Pyrex substrate with epoxy. Multiplexers and silicon dies are gold wire bonded to their prospective circuit locations. This completes the pressure sensing and scanning half of the electronics package.

The amplifier is constructed using standard printed circuit board technology, and utilizes a monolithic instrumentation amplifier as the active component on the printed circuit card. The amplifier card makes contact with the pressure sensing substrate through gold plated, spring loaded contacts soldered to the amplifier card. These spring loaded contacts are aligned with gold contact pads on the sensing substrate.

A system capable of controlling temperatures from −184° C. to +220° C. and pressures from 0 to 344.74 Kpa was used to calibrate the sensing module. A thermocouple accurate to within +/−0.1° C. of reading was used to calibrate the temperature of sensors within the module.

Due to the parallel circuit of the sensor supply bus which necessitates constant voltage excitation, and sensor resistance which decreases as temperature decreases, the sensors are more sensitive with decreasing temperature. The hysteresis, however, is less than the resolution of the encoder.

The measurement of calibration pressures is accurate to within +/−0.01% of full scale (344.74 Kpa). The set point resolution is 3.447 Pa. Helium is used as the calibration gas. The uncertainty of the temperature controller is +/−0.5° C. with a temperature deviation of +/−0.1° C. after stabilization. The repeatability following a temperature reset is +/−0.25° C.

The uncertainty of the analog to digital conversion system used to scan the pressure module is +/−0.01% F.S. The resolution of the analog to digital conversion system is +/−0.01% F.S. The overall error of the multichannel pressure sensing system, based on several pressure and temperature calibrations repeated within 180 days is 0.1% F.S. for −196° C. to +100° C. over the differential pressure range −101.35 Kpa to +241.32 Kpa.

Many modifications, improvements and substitutions will be apparent to the skilled artisan without departing from the spirit and scope of the present invention as described in the specification and defined in the following claims.

What is claimed is:

1. A cryogenic pressure sensor comprising:
   a plate having at least one pneumatic port passing therethrough;
   a substrate, composed of borosilicate, compliantly bonded to said plate, said borosilicate substrate having at least one pneumatic port passing therethrough, each said pneumatic port aligned with one said pneumatic port of said plate;
   a plurality of silicon pressure die mounted on said borosilicate substrate, each said silicon pressure die located above one said pneumatic port;
   a Wheatstone bridge circuit formed on said silicon die, said Wheatstone bridge circuit comprising bridge elements of silicon doped with boron to a dopant density level of approximately $1 \times 10^{19} - 10^{21}$ boron/cm$^3$;
   a bridge element formed on periphery of said silicon die separate from said Wheatstone bridge circuit, said bridge element being insensitive to pressure and providing a temperature measurement of said silicon die, said bridge element comprised of silicon doped with boron to a dopant density level of approximately $1 \times 10^{19} - 10^{21}$ boron/cm$^3$;
   metallization tracks on said silicon die;
   a high dopant layer between said tracks and said silicon die, said high dopant layer comprised of silicon doped with boron to a dopant density level of approximately $1 \times 10^{19} - 1 \times 10^{23}$ boron/cm$^3$; and
   means for electronically scanning said silicon die to sense pressure.

2. The pressure sensor according to claim 1, wherein said borosilicate substrate is pre-patterned with gold circuit traces, said pre-patterned traces comprising a first metallization layer of titanium/tungsten approximately 1000 Angstroms thick deposited on said substrate, a second gold layer approximately one micron to approximately 1.5 microns thick deposited on said titanium/tungsten layer, and a circuitry pattern etched in said first and second layers, wherein said gold layer provides for both conduction and nonoxidation.

3. The pressure sensor according to claim 1, wherein said plate material is Kovar.

4. The pressure sensor according to claim 1, wherein said substrate is compliantly bonded to said plate with a polyamide adhesive film.

5. The pressure sensor according to claim 1, wherein said substrate is compliantly bonded to said plate with a polyimide in liquid suspension in solvent.

6. The pressure sensor according to claim 1, wherein said plurality of silicon pressure dies comprise single crystalline silicon.

7. The pressure sensor according to claim 1, wherein said plurality of silicon pressure dies comprise polysilicon.

8. A method of manufacturing a cryogenic pressure sensor, comprising the steps of:

preparing a borosilicate substrate for bonding to a plurality of silicon pressure dies;

loading said dies and prepared substrate into a fixture for electrostatic bonding of said dies to said substrate;

positioning cathode and anode plates to the bottom and top, respectively, of said fixture;

heating said loaded fixture and said cathode and anode plates in a vacuum oven to approximately 375 degrees Celcius equilibrium temperature after evacuating to a pressure below $5 \times 10^{-6}$ torr;

applying electrical potential of approximately 800 volts D.C.;

cooling said oven to room temperature;

removing said bonded dies and substrate from said fixture;

compliantly bonding said bonded dies and substrate to a tubing plate, said plate having at least one pneumatic port passing therethrough;

mounting multiplexer chips on said substrate; and bonding said multiplexers and said dies to their corresponding circuit locations.

9. The method of claim 8, wherein said step of preparing said borosilicate substrate comprises:

metallizing said borosilicate substrate;

circuit patterning said metallized borosilicate substrate;

drilling pressure orifices in said metallized and patterned borosilicate substrate at the center of each said die location; and thermally annealing said drilled, metallized, and patterned borosilicate substrate.

10. The method of claim 9, wherein said metallizing step comprises:

depositing an adhesion layer of tungsten with 10 percent titanium, approximately 1000 Angstroms thick, on said borosilicate substrate; and overcoating said tungsten/titanium layer with a gold layer, wherein said gold layer is approximately one micrometer thick.

11. The method of claim 9, wherein said thermal annealing is in air at 600 degrees Celsius for one hour.

12. The method of claim 8, wherein said compliant bonding step comprises:

placing a polyamide film on said tubing plate, said polyamide film having holes corresponding to said ports in said tubing plate, said polyamide film cut to the size of said substrate;

placing said bonded dies and substrate on said polyamide film, with said substrate contacting said polyamide film with the holes registered;

evacuating said filmed tubing plate, and bonded dies and substrate, and heating to greater than 125 degrees Celcius.

13. The method of claim 8, wherein said compliant bonding step comprises:

applying a polyimide in liquid suspension in solvent to said tubing plate;

evacuating said filmed tubing plate, and bonded dies and substrate, and heating to greater than 125 degrees Celcius.

14. The method of claim 8, wherein said bonding of said multiplexers and said dies to their corresponding circuit locations is gold-wire bonding.

15. The method of claim 8, wherein said fixture material is a dielectric high temperature material.

16. The method of claim 8, wherein said fixture material is $SiO_2$.

17. The method of claim 9, wherein said fixture precisely positions each said die, in a sensor array, over its corresponding pressure orifice in said prepared substrate and allows for pressure to be applied to each said die to bring each said die into contact with said prepared substrate.

18. The method of claim 17, wherein said pressure is applied by spring loaded contacts inserted into holes case in said fixture and centered over each die location.

19. The method of claim 18, further comprising a silicon plate, said silicon plate having the same outline as its corresponding die and distributing mechanical load induced by said spring loaded contact, said contact holding said die in contact with said prepared substrate during bonding and allowing electrical contact for bonding potential to be applied.

20. A method of manufacturing a cryogenic pressure sensor, comprising the steps of:

preparing a borosilicate substrate for bonding to a plurality of silicon pressure dies;

loading said dies and prepared substrate into a fixture for electrostatic bonding of said dies to said substrate;

positioning cathode and anode plates to the bottom and top, respectively, of said fixture;

heating said loaded fixture and said cathode and anode plates in an oven to approximately 375 degrees Celcius equilibrium in an inert atmosphere;

applying electrical potential of approximately 800 volts D.C. to the fixture;

cooling said oven to room temperature;

removing said bonded dies and substrate from said fixture;

compliantly bonding said bonded dies and substrate to a tubing plate, said plate having at least one pneumatic port passing therethrough;

mounting multiplexer chips on said substrate; and bonding said multiplexers and said dies to their corresponding circuit locations.

21. The method of claim 20, wherein said inert atmosphere is selected from the group consisting of nitrogen, argon, and helium.

* * * * *